United States Patent

Oppat

[11] Patent Number: 5,555,440
[45] Date of Patent: Sep. 10, 1996

[54] PARALLEL INTERFACE FOR CONNECTING DATA PROCESSING DEVICES TO ONE ANOTHER OVER BIDIRECTIONAL CONTROL LINES

[75] Inventor: Jörg Oppat, Berlin, Germany

[73] Assignee: Siemens Nixdorf Informationssysteme Aktiengesellschaft, Paderborn, Germany

[21] Appl. No.: 146,150

[22] PCT Filed: Mar. 8, 1993

[86] PCT No.: PCT/DE93/00209

§ 371 Date: Nov. 8, 1993

§ 102(e) Date: Nov. 8, 1993

[87] PCT Pub. No.: WO93/18449

PCT Pub. Date: Sep. 16, 1993

[30] Foreign Application Priority Data

Mar. 10, 1992 [DE] Germany .................. 42 07 573.4

[51] Int. Cl.[6] .................................................. G06F 13/00
[52] U.S. Cl. .................... 395/892; 395/306; 364/240; 364/935.3; 364/DIG. 2
[58] Field of Search ............................ 395/275, 892, 395/200, 306; 364/200, 900

[56] References Cited

U.S. PATENT DOCUMENTS

| | | | |
|---|---|---|---|
| 4,631,698 | 12/1986 | Walsh et al. | 395/275 |
| 5,133,055 | 7/1992 | Lieberman et al. | 395/889 |
| 5,239,627 | 8/1993 | Beck et al. | 395/275 |
| 5,299,314 | 5/1994 | Gates | 395/200.2 |

FOREIGN PATENT DOCUMENTS 0506594  9/1992  European Pat. Off. .

OTHER PUBLICATIONS

IBM Technical Disclosure Bulletin, vol. 26, No. 11, "Printer Interface", by Hsieh et al, Apr. 1984, pp. 5783–5784.
IBM Technical Disclosure Bulletin, vol. 33, No. 3B, "Query Printer Status", Aug. 1990, pp. 88–89.
An article entitled: "Contriving parallel I/O on the IBM PC", M. Hale, Electronics World and Wireless World, vol. 95, No. 1645, Nov. 1989, pp. 1089–1092.

*Primary Examiner*—Christopher B. Shin
*Attorney, Agent, or Firm*—Hill, Steadman & Simpson

[57] ABSTRACT

A parallel interface for connecting data processing devices to one another or to peripheral devices, particularly a personal computer to a printer, has at least two status information lines, disconnectable line drivers and control lines (SLCT, SLCTIN), the beginning of the data transmission being signaled by the transmitting device on a first control line (STBN) for a predetermined data transmission direction and the end of the data transmission being signaled by the receiving device on a second control line (ACKN). To implement a bidirectional interface with high transmission speed, the two status information lines (SLCT, SLCTIN) are used for disconnecting the line drivers of the device receiving in each case, in order to change over the direction of data transmission. After the direction of data transmission has been changed over, the second control line (ACKN) is used by the then transmitting device in the same manner as the first one before the change-over and the first control line (STBN) is used by the then receiving device in the same manner as the second one before the change-over.

8 Claims, 6 Drawing Sheets

PARALLEL INTERFACE FOR CONNECTING DATA PROCESSING DEVICES TO ONE ANOTHER OVER BIDIRECTIONAL CONTROL LINES

BACKGROUND OF THE INVENTION

The invention relates to a parallel interface for connecting data processing devices to one another or to peripheral devices, particularly a personal computer to a printer, having at least two status information lines, disconnectable line drivers and control lines, the beginning of the data transmission being signaled by the transmitting device on a first control line for a predetermined data transmission direction and the end of the data transmission being signaled by the receiving device on a second control line.

To connect peripheral devices at a personal computer, a serial interface for data communication and a parallel interface for connecting a printer is provided, as a rule. The serial interface can be simultaneously used both for outputting and for inputting but is restricted in its speed to about 2 kBytes/s since the data is transmitted bit by bit. The parallel interface can reach an output speed of about 100 kBytes/s due to eight data lines which can be used in parallel and additional control lines. However, input from the peripheral device to the computer is not possible, it is only possible to transmit elementary status information items by means of dedicated signal lines, namely ready status ("selected"), end of paper ("paper end") and error ("error").

Today, printers are equipped with their own processors and can send back extensive test, diagnostic and status information when they are operated via a suitable interface. This particularly applies to printers in which the information to be printed is coded via the page description language of POSTSCRIPTTM in which this return information is expressly included in the language. For this purpose, such printers previously had to be connected via the serial interface. Although it is possible to omit the return channel in many cases in order to be able to utilize the higher speed of the parallel interface, cases are known in which a return channel cannot be omitted and thus the parallel interface cannot be used, for example a savings book printer which, before printing, must read a magnetic coding of the savings book from the savings book to be printed and transmit this coding back to the data processing device. Fast parallel and bidirectionally interfaces are also known. However, they are frequently not used because of the high additional costs for hardware and software required for them.

SUMMARY OF THE INVENTION

It is the object of the invention to design and operate a parallel interface in such a manner that its previous function as printer interface is retained and the same interface can be operated bidirectionally at the same high speed in both directions for extended printers or other peripheral devices.

In a first variant of the solution, the invention achieves the object in a parallel interface of the type initially mentioned in that the two status information lines are used for disconnecting the line drivers of the device receiving in each case, in order to change over the direction of data transmission, and in that, after the direction of data transmission has been changed over, the second control line is used by the then transmitting device in the same manner as the first one before the change-over and the first control line is used by the then receiving device in the same manner as the second one before the change-over.

The invention is based on the finding that control and status information lines no longer need to be used in their originally defined form and can therefore be used, together with a dual function of existing lines, for achieving the object.

This makes it possible to connect peripheral devices which need a high data transmission speed and reverse transmission, to a parallel interface, in which arrangement all previous forms of outputs can still be used over the same interface. In particular, an interface according to the invention is suitable for carrying out a fast data exchange in both directions between two data processing devices without requiring additional hardware for this. The software is of the same type for both devices to be connected.

In interfaces of the type considered here, an interrupt control is provided, for example, on both sides so that pulse-shaped signals can be used for signaling beginning and end of the data transmission. The pulse-shaped end signal has previously been provided for operating a printer because printers were very slow and the computer was able to fulfil other tasks whilst waiting for the transmission of the next character. The pulse-shaped start signal was preferably used for storing the data in a hardware register where they were then supplied to the printing mechanisms through hard wired logic. The invention is especially based on the consideration that both signals have equivalent functions if it is not printers and computers but generally devices with data processing functions which are assumed to be the devices to be connected.

If there is an interface with a first control line connected via an "open-collector" stage, the device transmitting after the change-over can additionally signal the beginning of its data transmission on the first control line in further development of the concept of the invention.

The result is that when an interrupt control is missing or temporarily deactivated, one of the two connected devices can find out by simple interrogation of the signal on the first control line that the other device has begun with its data transmission.

In a parallel interface of the type initially mentioned, the second variant of the solution according to the invention is characterized by the fact that the two status information lines are used for disconnecting the line drivers of the device which is in each case receiving, in order to change over the direction of data transmission and in that, after the change-over of the direction of data transmission, the second control line is used by the then transmitting device in the same manner as the first one before the change-over and on the first control line, connected via an "open-collector" stage, a signal which, together with the second control line, identifies the beginning of the data transmission is output by the then transmitting device during its data transmission.

This approach to the solution is based on the same findings as the first one but uses a control line bidirectionally and additional static signaling of the beginning of transmission for the input direction. As a result, the solution is no longer symmetric so that, in contrast to the first solution, the software must be different on both devices. However, it makes fewer demands on this same software due to the static signal.

For those interfaces in which at least two further control lines are provided, the duration of the data transmission being signaled by the receiving device on the third control line given the predetermined direction of data transmission, both variants of the solution according to the invention can be advantageously developed in such a manner that, after the direction of data transmission has been changed over, the then receiving device signals the duration of the data transmission by means of the fourth control line, in the same manner as by means of the third control line before the change-over.

This is because, in addition to the pulse-shaped signals, there is a signal which statically signals the "busy" state which can already be derived from the dynamic signals. This technique has been successful in practice and is therefore analogously developed for the reverse direction, using a signal line which is otherwise unused in fact.

In the text which follows, the way in which the invention can be executed in practice is explained with reference to the drawing. It is assumed by way of example that a computer is connected to a multifunctional printer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
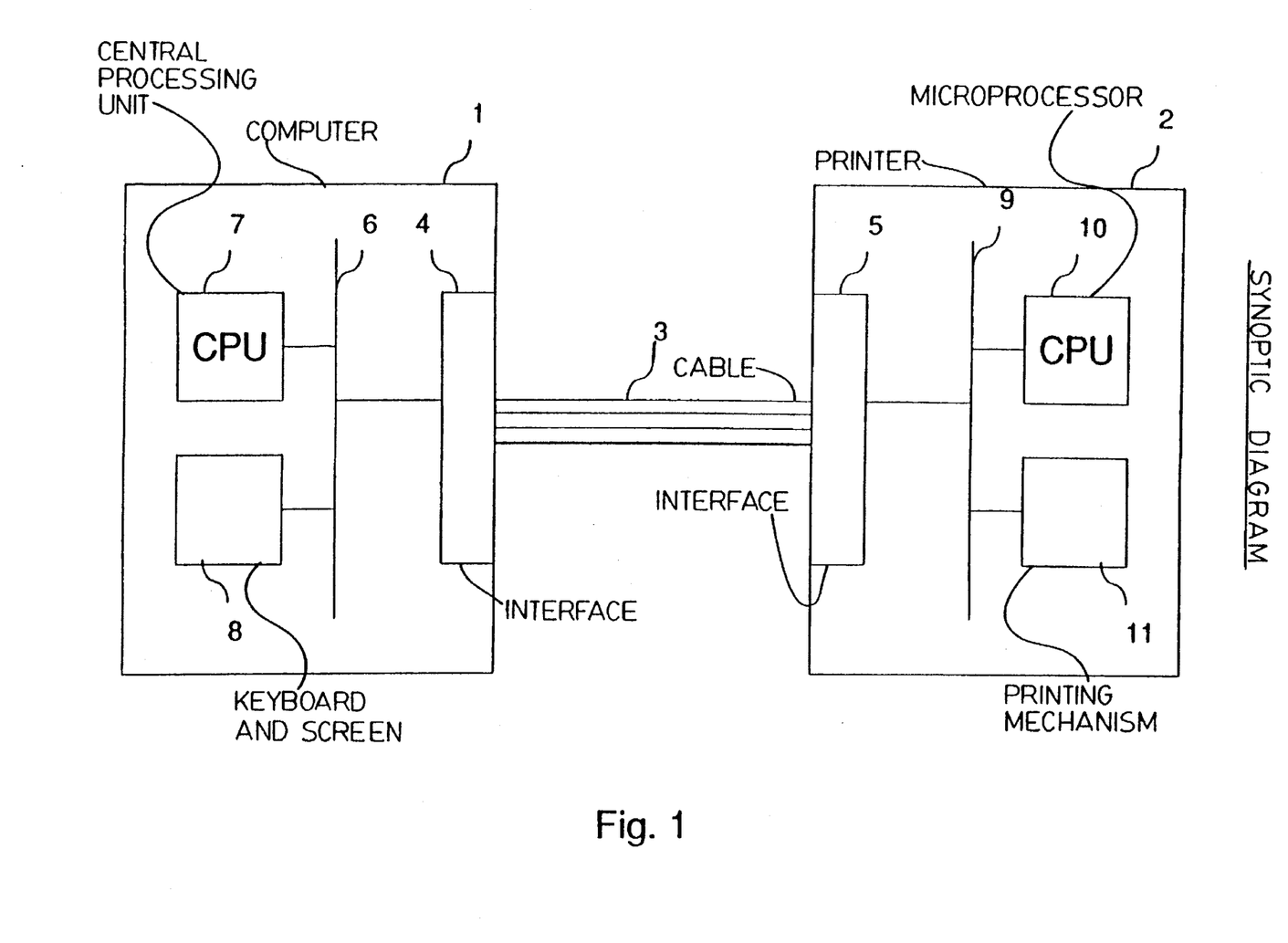
FIG. 1 is a block diagram of the device configuration involved.

FIG. 1 shows a typical arrangement in which a computer 1 is connected to a printer 2 via a cable 3. The cable 3 establishes the connection between interfaces 4 and 5 which are very similar to one another and can even be identical in the case of the invention described here.

The internal configuration of the computer 1 is represented by a data and address bus 6, a central processing unit 7 and other components 8, where the component 8 can be, for example, keyboard and screen for the user; it is similarly assumed that the printer according to the prior art contains a microprocessor 10 which is connected to the interface 5 and other components 11 via a bus 9, the component 11, for example, actually printing the paper.

Figure 2:
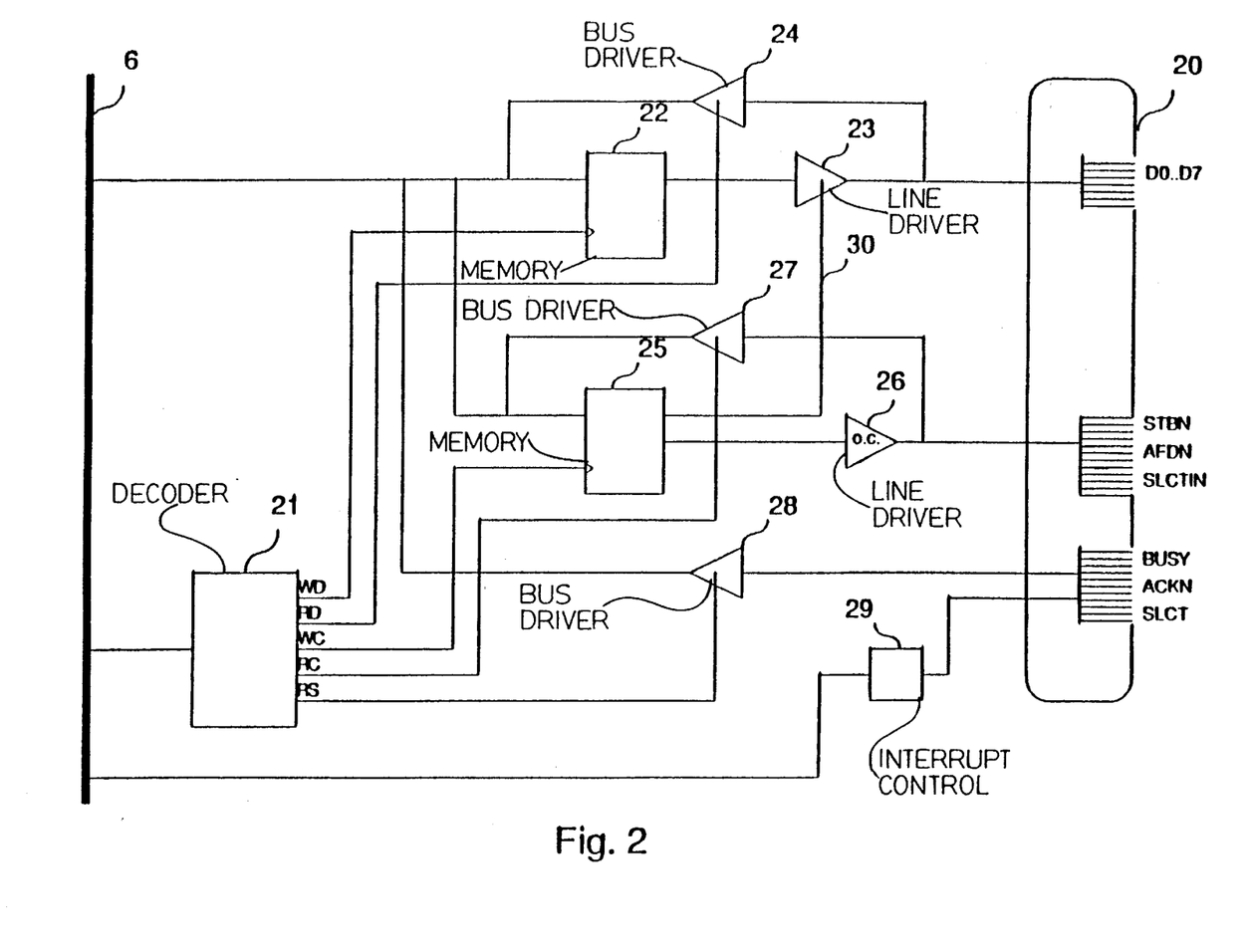
FIG. 2 is a block diagram of the parallel interface used.

FIG. 2 shows the interface 4 in greater detail. A simplified representation has been chosen in which a line or, respectively, a function block, represents a number of similar elements as is indicated by the multiple representation in the right-hand part of the FIG. 2. The interface contains a plug-in connector 20 to which the cable 3 is connected, and is supplied with data, address information and other status signals via the bus 6. A decoding device 21 generates signals WD, RD, WC, RC and RS in accordance with the protocol agreed for the bus 6 for activating the further chips, in this case a data memory 22 which in each case buffers a byte output by means of the WD signal and forwards it via a line driver 23 to the connector 4 or respectively to eight data lines D0 to D7. A bus driver 24, which is activated, if necessary, by the RD signal from the decoding unit 21, is provided for the reverse transmission from the printer 2. Similar conditions exist for the output of control signals STBN, AFDN and SLCTIN to the printer 2; in this case, the control signals are stored in a memory 25 and connected to the cable 3 via a line driver 26. The line driver 26 is an open-collector driver; the load resistors necessary for this are not drawn. A bus driver 27 by means of which the signals output by the printer 2 can be read in again by the RC signal is used for reverse transmission. Although the two bus drivers 24 and 27 are not needed for the output function of the interface 4 and are not used by normal user software, they are very useful for checking the interface for short circuit on the output lines. A bus driver 28 which is activated by the RS signal is used for transferring status signals BUSY, ACKN and SLCT from the printer 2. A function block 29 indicates an interrupt control which can generate an interrupt request on the bus 6 with a pulse on the ACKN line.

The connection 30 from the memory 25 to the line driver 23, by means of which the line driver 23 can be disconnected, is of importance to the operation of the interface. For this purpose, the memory 25 is designed to be one bit wider than for the line driver 26. This additional bit, usually bit 5, directly controls the line driver 23 and thus allows bidirectional utilization of the eight data lines D0 to D7. However, there is no further hardware which controls or supports handling of the data transmission by the interface 4; this is carried out by software in the computer 1 and printer 2.

The definition of the interface signals for pure output printer operation as shown in FIG. 2 is:

| Name | Type | Function |
|---|---|---|
| D0 ... D7 | Output | Data lines |
| STBN | Output | Data transfer (strobe) |
| BUSY | Input | Busy |
| ACKN | Input | Acknowledgement |
| SLCTIN | Output | Activation |
| SLCT | Input | Ready |
| AFDN | Output | Autofeed |

Data lines D0 ... D7 and control lines BUSY, STBN and ACKN are used for coordinating the data transmission.

The SLCT signal signals the general operational readiness of the peripheral device. SLCTIN deactivates the device so that subsequent data transmissions are ignored. This function was developed for applications with serial transmission, in which the printer receives the same data stream as the data display and is only intended to print out selected parts, and has been taken over as function for the parallel, activation. However, it is no longer actively utilized, that is to say used for deactivation; many printers ignore this signal. However, it is possible that programs activate the printer via this signal for safety reasons; an extended use in the sense of the invention must therefore be designed in such a manner that this cannot produce any disturbances.

The AFDN signal, which changes the function of the "CR" (code 13) character so that a line feed is additionally generated is also unused. This signal is also no longer used in practice and no longer supported by many printers.

Figure 3:
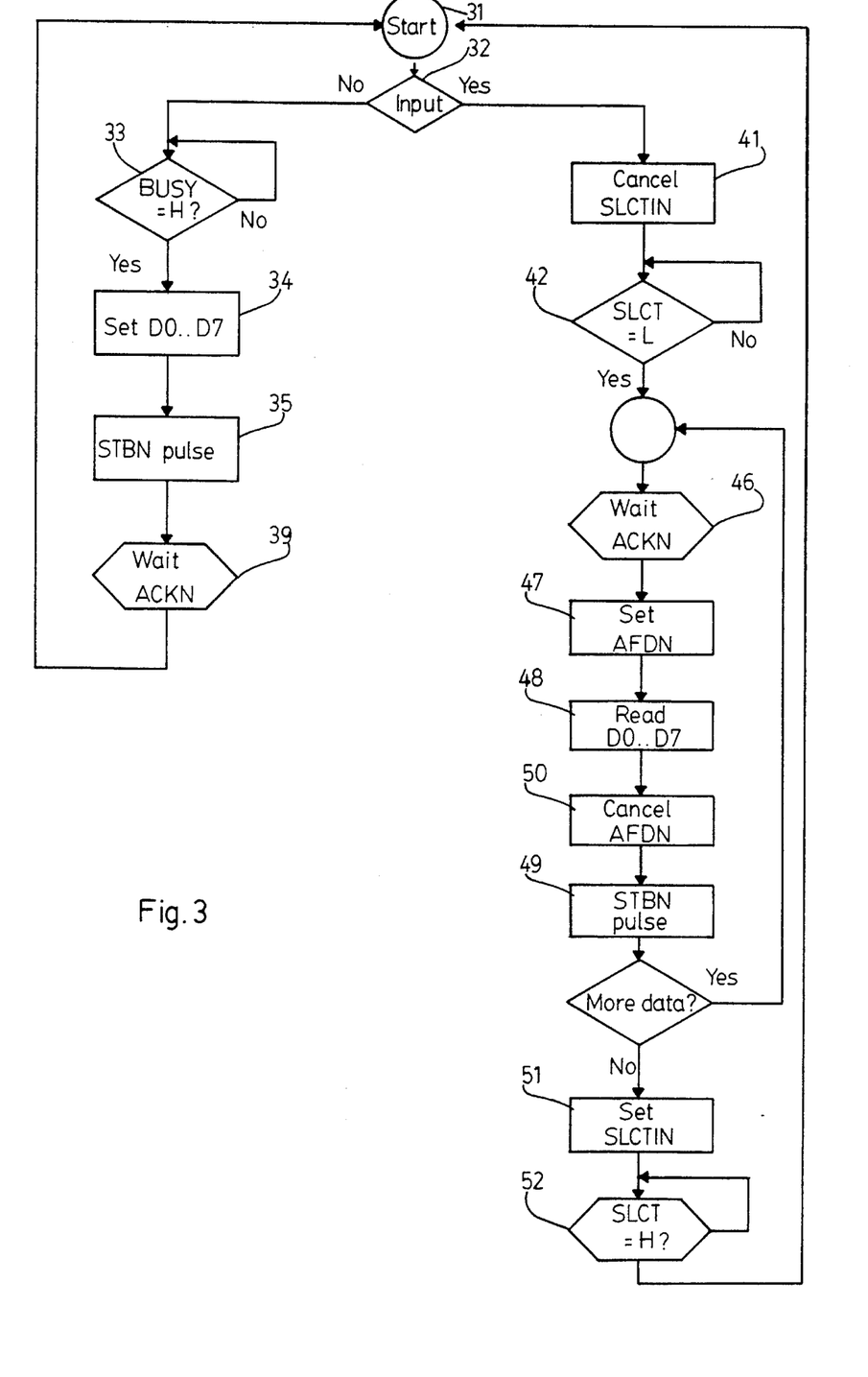
FIG. 3 is a flow chart which is used for representing the necessary sequences in the computer.

FIG. 3 shows a flow chart which corresponds to the programming of the computer. The programming of the printer is similar and results from the signal variations at the interface.

Figure 4:
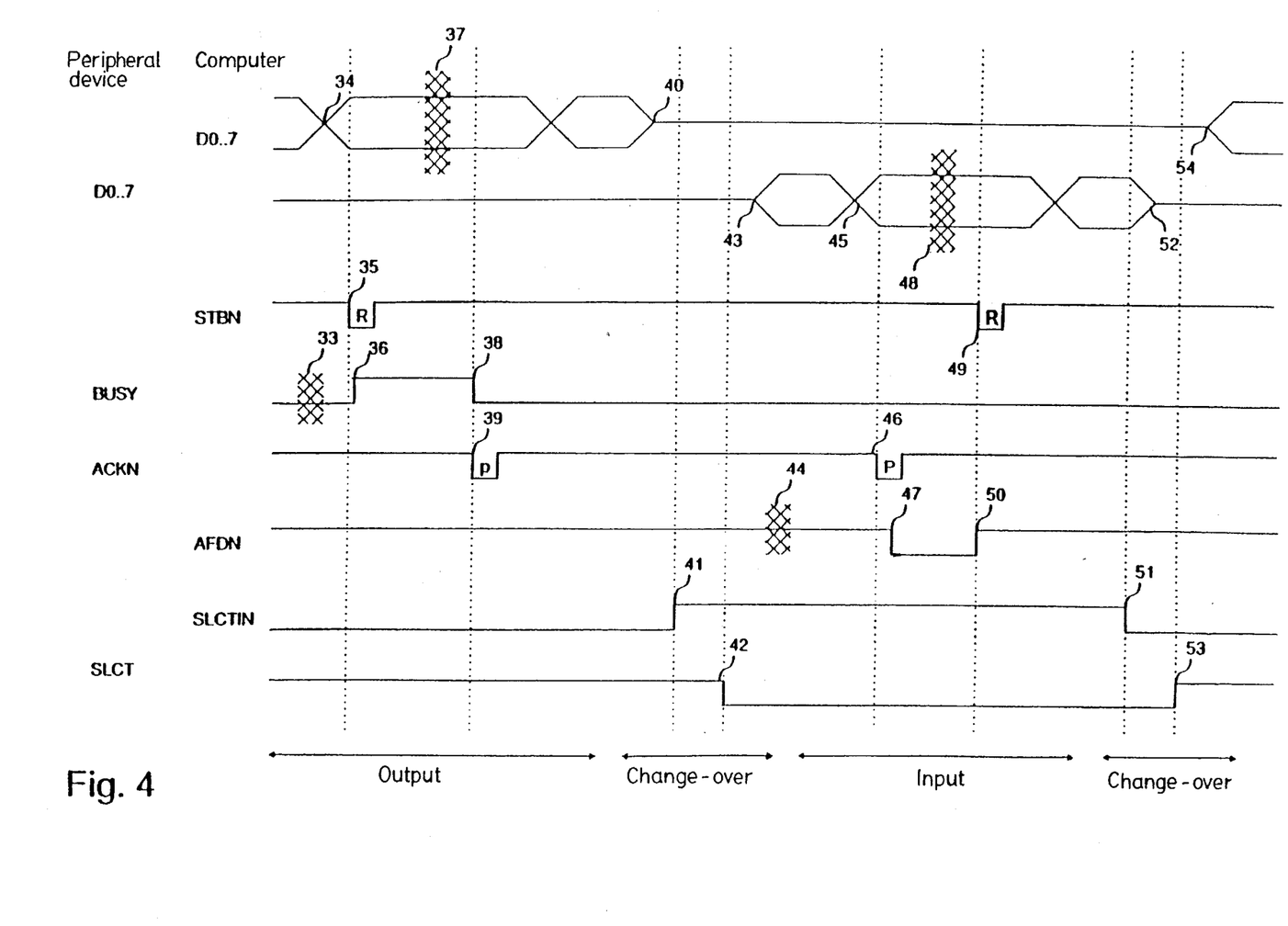
FIG. 4, FIG. 5 and FIG. 6 are representations of the signal variations on the transmission lines for various cases.

FIG. 4 shows the signal variation on the connecting lines between computer and printer by way of example for the output of one byte immediately followed by an input. Error processing is not dealt with and is added in accordance with conventional procedure. FIG. 4 contains reference symbols which correspond to the steps shown in FIG. 3 and additionally specify functional steps of the printer.

The output begins with the start step 31 in the computer. As is usual in practice, it is assumed that the necessary initializations have already been carried out and, for example, the SLCTIN signal is activated and the line drivers 23 are connected. Using the interface in accordance with the invention leaves it in this state after a return message.

After the decision 32 that an output is to take place, the computer checks the BUSY signal in step 33 in order to ensure that the printer is ready to receive. This is normally the case, so that the computer can put the output byte on the data lines D0 to D7 in step 34. Following that, it generates a pulse on the STBN line in step 35. The letter R in FIG. 4 indicates that the pulse is being generated by the computer. In response to the pulse, the printer sets the BUSY signal in step 36. The printer thus logically inhibits data lines D0 to D7, that is to say the computer must not change the signals on data lines D0 to D7 until BUSY is deactivated, which is ensured by the data memory 22 in the interface. In step 37, the printer takes over the data on the data lines D0 to D7 and processes them. If it is ready to receive the next byte, it deactivates the BUSY signal in step 38 and simultaneously generates the pulse P on the ACKN line in step 29 in order to enable the computer via the interrupt control 29 to produce new outputs, which returns the control to step 32 in the flow chart shown in FIG. 3.

Following the output, the computer wants to carry out an input and thus decides in step 32 to use the back channel. In step 40, it first deactivates the line driver 23 via line 30. After that, or simultaneously, it deactivates the SLCTIN signal in step 41 and thus requests the printer to send one byte. The printer acknowledges the request by deactivating SLCT in step 42 and can now activate its line drivers 23 in step 43. Since the AFDN line has the role of the BUSY line in the reverse direction, the printer checks this signal in step 44. In a normal case, the printer can then connect the byte to be transmitted to the data lines D0 to D7 in step 45 and, using a pulse P on the ACKN line, cause the computer to respond via the interrupt control 29 in step 46. The computer acknowledges the pulse in that it activates the AFDN signal in step 47 and then accepts and processes the data in step 48 analogously to the other direction. If it is ready to accept other data, it signals the end of transmission by the pulse R on the STBN line in step 49 and cancellation of the AFDN signal in step 50.

In step 51, the computer sets the SLCTIN signal in order to indicate to the printer that the direction of transmission must be changed back to the output direction. The printer thereupon disconnects its line driver 23 in step 52 and acknowledges with an activation of SLCT in step 53, whereupon the computer reactivates its line driver 23 in step 54. Thus, the signal state prevailing at the beginning of an output is reached again.

Figure 5:
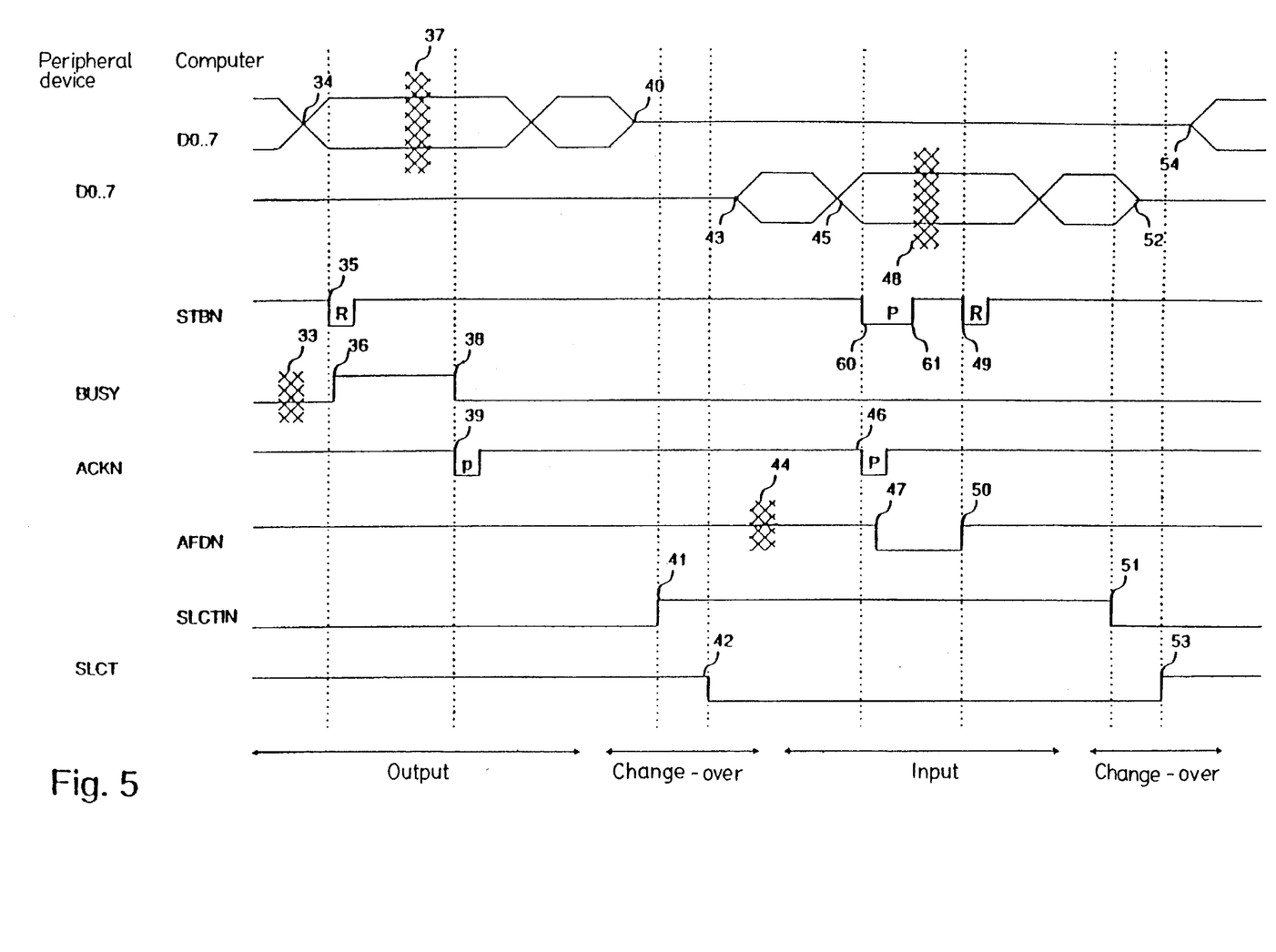

FIG. 5 shows a development in which it does not need to be assumed that the computer reliably discovers the interrupt signal on the ACKN line in step 46. The beginning of the reverse transmission is therefore indicated by a static signal. Since no free line is available for this purpose, the fact is utilized that the line drivers 26 are designed as "open-collector" stages both in the computer and in the printer, at least for the STBN signal. Up to step 46, the progress corresponds to that already described; but together with step 46, the printer now activates the STBN line in step 60 and thus uses it in a direction opposite to the original one. In step 47, the computer acknowledges that it has recognized the beginning of data transmission; after that, the printer cancels the STBN signal in step 61 and may activate its own interrupt control. The computer is now able to signal the end of reverse transmission in steps 49 and 50 as before.

Figure 6:
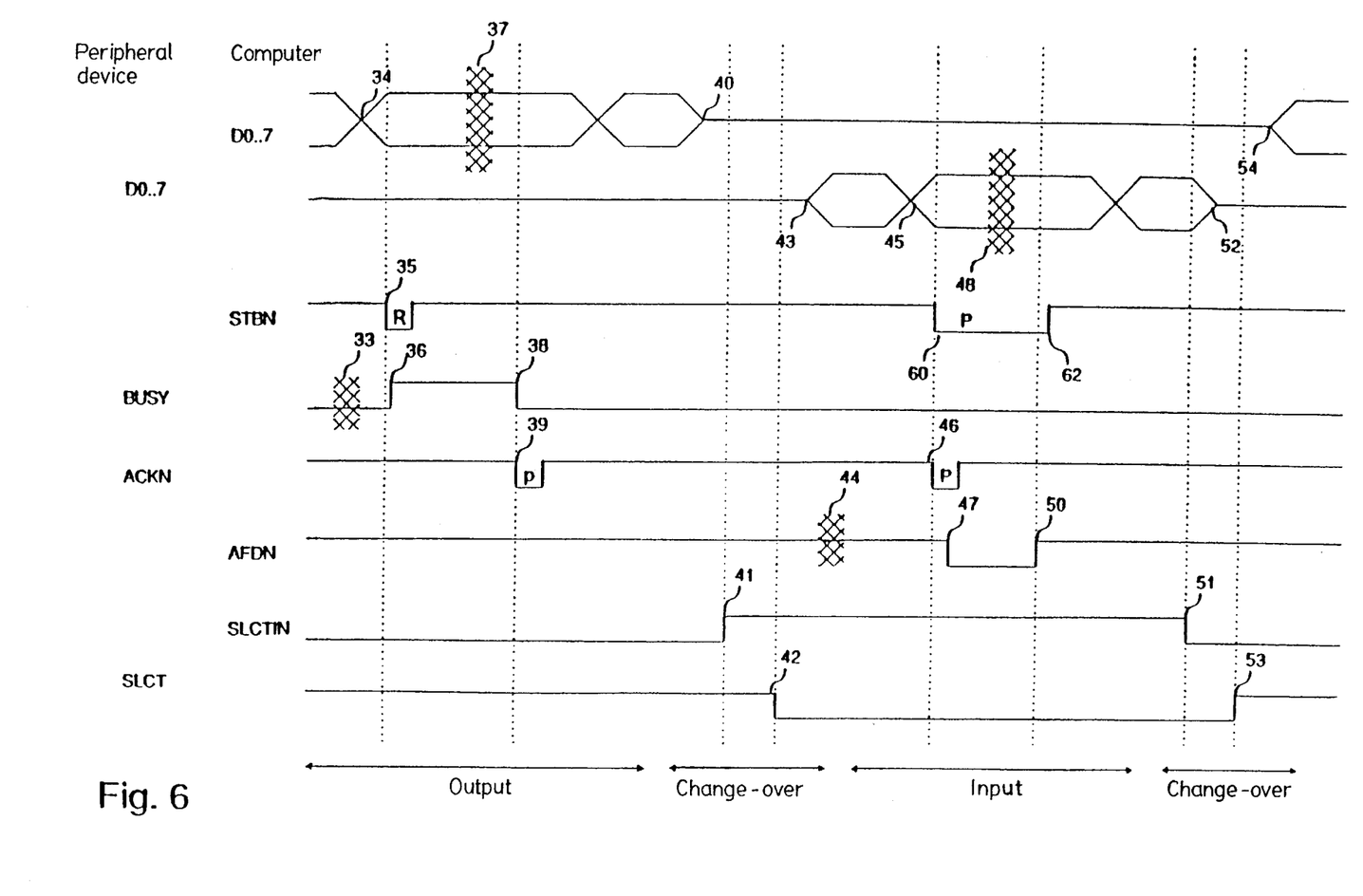

If the printer does not have any interrupt control but a static signaling of the beginning of reverse transmission appears to be necessary as before, the interface according to FIG. 6 can be used. The steps again correspond to those shown in FIG. 4 up to step 46; as before, STBN is activated in step 60. In distinction from FIG. 5, however, the STBN signal is not canceled after step 47 but remains in the active state up to the end of the reverse transmission at 62 and is accordingly canceled after step 50.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A parallel interface for connecting data processing devices to one another or to peripheral processing devices, comprising:

at least two status information lines, bidirectional line drivers and control lines, the bidirectional line drivers being open-collector stages, a first data processing device initially being a transmitting device and a second data processing device initially being a receiving device, the transmitting device initially having a connected line driver and the receiving device initially having a disconnected line driver, the transmitting and receiving devices being connected to the at least two status information lines and to the control lines;

a beginning of a first data transmission being signaled by the transmitting device, in the first processing device, on a first control line for a predetermined data transmission direction, and an end of the first data transmission being signaled by the transmitting device, in the second processing device, on a second control line, the two status information lines being used for controlling line drivers of the second processing device, in order to change over the direction of data transmission; and after the direction of data transmission has been changed over, the line driver in the first data processing device being disconnected and the line driver in the second data processing device being connected, a beginning of a second data transmission being signaled by a transmitting device, in the second processing device, on the first control line in a direction of transmission opposite to the direction of transmission for signaling a beginning of the first data transmission, and an end of the second data transmission being signaled by the transmitting device, in the first processing device, on the first control line.

2. The interface as claimed in claim 1, wherein the interface further comprises: at least third and fourth control lines, a duration of the data transmission being signaled by a receiving device on the third control line given the predetermined direction of data transmission, and wherein after the direction of data transmission has been changed over, a present receiving device signals the duration of the data transmission by means of the fourth control line in the same manner as the third control line before the change-over.

3. The interface as claimed in claim 1, wherein the parallel interface connects a personal computer to a printer.

4. A parallel interface for connecting data processing devices to one another or to peripheral devices, comprising:

at least two status information lines, disconnectable line drivers and control lines, a first data processing device initially being a transmitting device and a second data processing device initially being a receiving device, the transmitting device initially having a connected line driver and the receiving device initially having a disconnected line driver, the transmitting and receiving devices being that are operatively connected to the at least two status information lines and to the control lines, a beginning of data transmission being signaled by the transmitting device on a first control line, the first control line carrying data transmissions in two directions, for a predetermined data transmission direction and an end of the data transmission being signaled by the receiving device on a second control line, the two status information lines being used for disconnecting line drivers of a present receiving device, in order to change over the direction of data transmission, and after the direction of data transmission has been changed over, the line driver in the first data processing device being disconnected and the line driver in the second data processing device being connected, the second control line being used by a present transmitting device in the same manner, for dynamic signaling, as the first control line before the change-over and additionally on the first control line, connected via an "open-collector" stage, a signal which, like the second control line, identifies the beginning of the data transmission is output by a present transmitting device during its data transmission.

5. The interface as claimed in claim 4, wherein the interface further comprises: at least third and fourth control lines, a duration of the data transmission being signaled by a receiving device on the third control line given the predetermined direction of data transmission, and wherein after the direction of data transmission has been changed over, a present receiving device signals the duration of the data transmission by means of the fourth control line in the same manner as the third control line before the change-over.

6. The interface as claimed in claim 4, wherein the parallel interface connects a personal computer to a printer.

7. A parallel interface for connecting a computer to a printer, comprising:

at least two status information lines, bidirectional line drivers and strobe and acknowledgement lines, the bidirectional line drivers being open-collector stages, a computer initially being a transmitting device and a printer initially being a receiving device, the transmitting device initially having a connected line driver and the receiving device initially having a disconnected line driver, the transmitting and receiving devices being connected to the at least two status information lines and to the control lines, each of the computer and printer having a respective bidirectional line driver;

a beginning of a first data transmission being signaled by a transmitting device, in the computer, on the strobe line for a predetermined data transmission direction, and an end of the first data transmission being signaled by a transmitting device, in the printer, on the acknowledgement line, the two status information lines being used for disconnecting the respective line driver of the printer, in order to change over the direction of data transmission; and after the direction of data transmission has been changed over, the respective line driver in the printer being connected and the line respective driver in the computer being disconnected, a beginning of a second data transmission being signaled by the transmitting device, in the printer, on the strobe line in a direction of transmission opposite to the direction of transmission of the first data transmission, and an end of the second data transmission being signaled by the transmitting device, in the computer, on the strobe line.

8. The interface as claimed in claim 7, wherein the strobe and acknowledgement lines are first and second lines, and wherein the interface further comprises: at least third and fourth control lines, a duration of the data transmission being signaled by a receiving device on the third control line given the predetermined direction of data transmission, and wherein after the direction of data transmission has been changed over, a present receiving device signals the duration of the data transmission by means of the fourth control line in the same manner as the third control line before the change-over.

* * * * *